(12) United States Patent
Coyle

(10) Patent No.: US 7,540,519 B1
(45) Date of Patent: Jun. 2, 2009

(54) EASY BICYCLE TRAINER

(76) Inventor: David W. Coyle, 6952 Country Lakes Cir., Sarasota, FL (US) 34243

( * ) Notice: Subject to any disclaimer, the term of this patent is extended or adjusted under 35 U.S.C. 154(b) by 133 days.

(21) Appl. No.: 11/853,458

(22) Filed: Sep. 11, 2007

(51) Int. Cl.
*B62H 7/00* (2006.01)

(52) U.S. Cl. .................. 280/293; 280/292; 280/296; 280/304.5; 280/288.4

(58) Field of Classification Search ................ 280/293, 280/292, 296, 304.5, 288.4
See application file for complete search history.

(56) References Cited

U.S. PATENT DOCUMENTS

| | | | | |
|---|---|---|---|---|
| 4,903,975 | A * | 2/1990 | Weisbrodt et al. ............ | 280/293 |
| 5,154,096 | A * | 10/1992 | Geller et al. ................ | 74/551.8 |
| 5,338,204 | A * | 8/1994 | Herndon ...................... | 434/247 |
| 5,407,222 | A * | 4/1995 | Harrison ..................... | 280/293 |
| 5,683,093 | A | 11/1997 | Hayes | |
| 5,791,675 | A | 8/1998 | Fleischer | |
| 5,845,724 | A * | 12/1998 | Barrett ....................... | 180/65.1 |
| 5,988,663 | A | 11/1999 | Starks | |
| D422,947 | S | 4/2000 | Brathwaite | |
| 6,120,050 | A | 9/2000 | Tillim | |
| 6,286,850 | B1 | 9/2001 | Conway | |
| 6,349,958 | B1 * | 2/2002 | Gawlik ....................... | 280/293 |
| 6,398,248 | B1 * | 6/2002 | Dodson ...................... | 280/293 |
| 6,474,670 | B2 * | 11/2002 | Shaw ......................... | 280/299 |
| 6,688,630 | B1 * | 2/2004 | Kayne ........................ | 280/293 |
| 6,712,376 | B2 * | 3/2004 | Eberhardt et al. ........... | 280/293 |
| 6,728,994 | B1 * | 5/2004 | Rushin et al. ................ | 16/426 |
| 2002/0121535 | A1 * | 9/2002 | Moore et al. ................ | 224/427 |
| 2004/0026892 | A1 * | 2/2004 | Ackerly ...................... | 280/293 |

* cited by examiner

*Primary Examiner*—Paul N Dickson
*Assistant Examiner*—Marlon A Arce
(74) *Attorney, Agent, or Firm*—Lawrence J. Gibney, Jr.

(57) ABSTRACT

This invention is a bicycle trainer, which is attached to the back wheel as well as the bolt of the bike seat of a bicycle that is being operated by a child. This will allow a parent to travel safely behind a bicycle and teach his or her child how to balance on a bicycle so that he or she may ride safely while at the same time minimizing injuries due to falls.

6 Claims, 5 Drawing Sheets

//EASY BICYCLE TRAINER

BACKGROUND OF THE INVENTION

A. Field of the Invention

This relates to being able to train a bicycle rider to ride a bike while traveling behind the bike.

B. Prior Art

Representative examples in the prior art can be found at Conway, U.S. Pat. No. 6,286,850, Tillim, U.S. Pat. No. 6,120,050 and Starks, U.S. Pat. No. 5,988,663. All three of the prior art references teach structures that are different than the current one.

Conway is a balance bar but does not allow braking of the bicycle. Tilllim is a training device but like Conway does not teach a means to brake. Similarly Starke is also a bicycle riding assistance device but does not allow braking.

Specifically, none of the prior devices have the ability to brake the bicycle from the rear or come equipped with adjustable and removable training wheels as contemplated by this particular device.

BRIEF SUMMARY OF THE INVENTION

This is a device attached to the back set of wheels of a bicycle when an individual—probably a child—is being trained to ride a bicycle. This device is particularly important as the child or new bicycle rider learns to balance on the bike. The device allows the caretaker or parent to guide the bicycle rider, which is usually a child, to prevent or at least minimize accidents.

It will be attached to the back wheels of the bicycle and has a handle that the parent grasps. It will be equipped with a handbrake that is secured to the back wheel. In the event that the parent needs to brake the bicycle, the parent will simply squeeze the handbrake and the bicycle is stopped.

Because the handle and the length of the handle may be adjusted, it will accommodate parents of different heights, while allowing the parent to remain erect, diminishing possible back strain and increasing the parents' visibility.

It is an object of this device to be able to train a child while learning to ride a bicycle. It is a further object to allow the parent to brake the bicycle.

DETAILED DESCRIPTION OF THE EMBODIMENTS

This device 5 will be used on a bicycle to teach the person, usually a child, to ride a bicycle. It may be used on any type of bicycle, up to twenty four inches, but it is anticipated that it will be used on a bicycle for a child. Children normally learn to ride a bicycle between the ages of five and six years old. With this device parents are able to interact with a child at an earlier age and this allows a parent to guide or teach the child how to ride a bike as the child learns to balance on a bicycle. This device may also be used with strong, adjustable and removable training wheels (not depicted).

Figure 3:
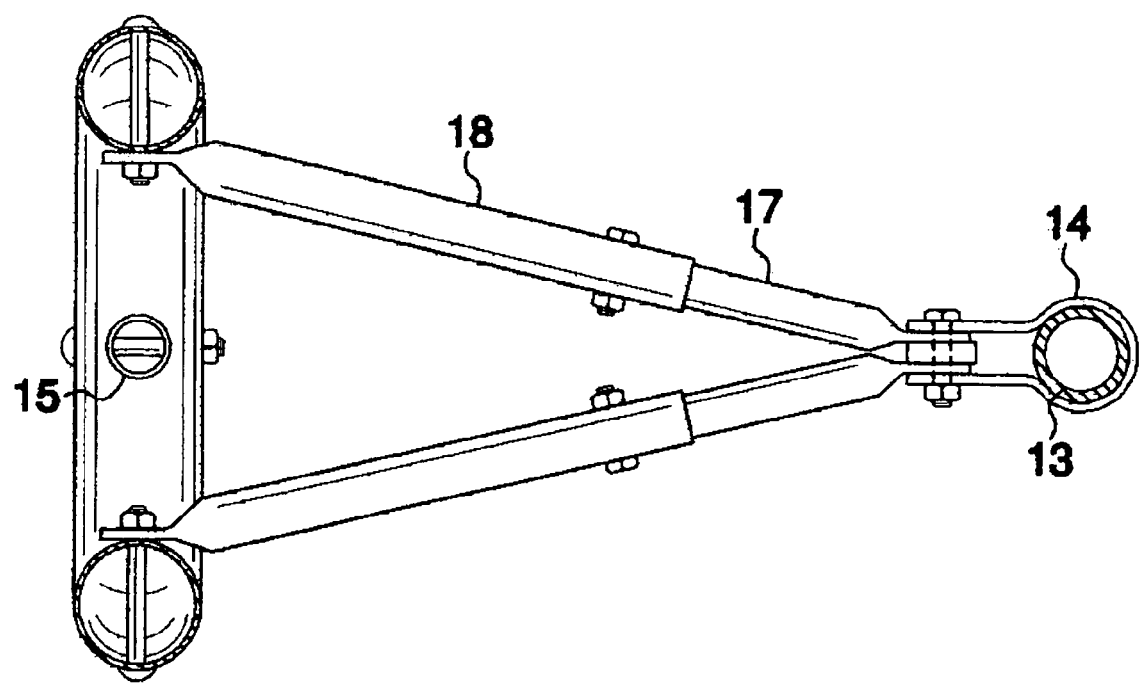
FIG. 3 is a view according to line 3-3 on FIG. 1.

The device will be attached on one end to the mounting bracket 14 which surrounds the seat post 13. The means of connection is likely to be a nut and bolt such as shown in FIG. 3. A pair of inner adjustable stability bars 17 move within an outer adjustable stability bar 18 to adjust the angle of the device relative to the parent. The means of connection to position the stability bars is likely to be a nut and bolt combination, which is placed through a hole in the adjustable stability bar and the inner stability bar 17 as depicted in FIG. 3. The telescoping feature of the respective stability bars will permit angular adjustment of the handle for maximum comfort for the parent.

The outer stability bar 18 is secured to a handle bar bracket 16. One end of the handle bar bracket is attached to the outer stability bar and the other is attached to the bicycle using the existing nut for the tire on the bicycle. The means of connection is likely to be a nut and bolt. The handle bar bracket 16 will be U shaped to completely surround the bicycle tire 7 and be connected to the axle for the bicycle tire.

Figure 1:
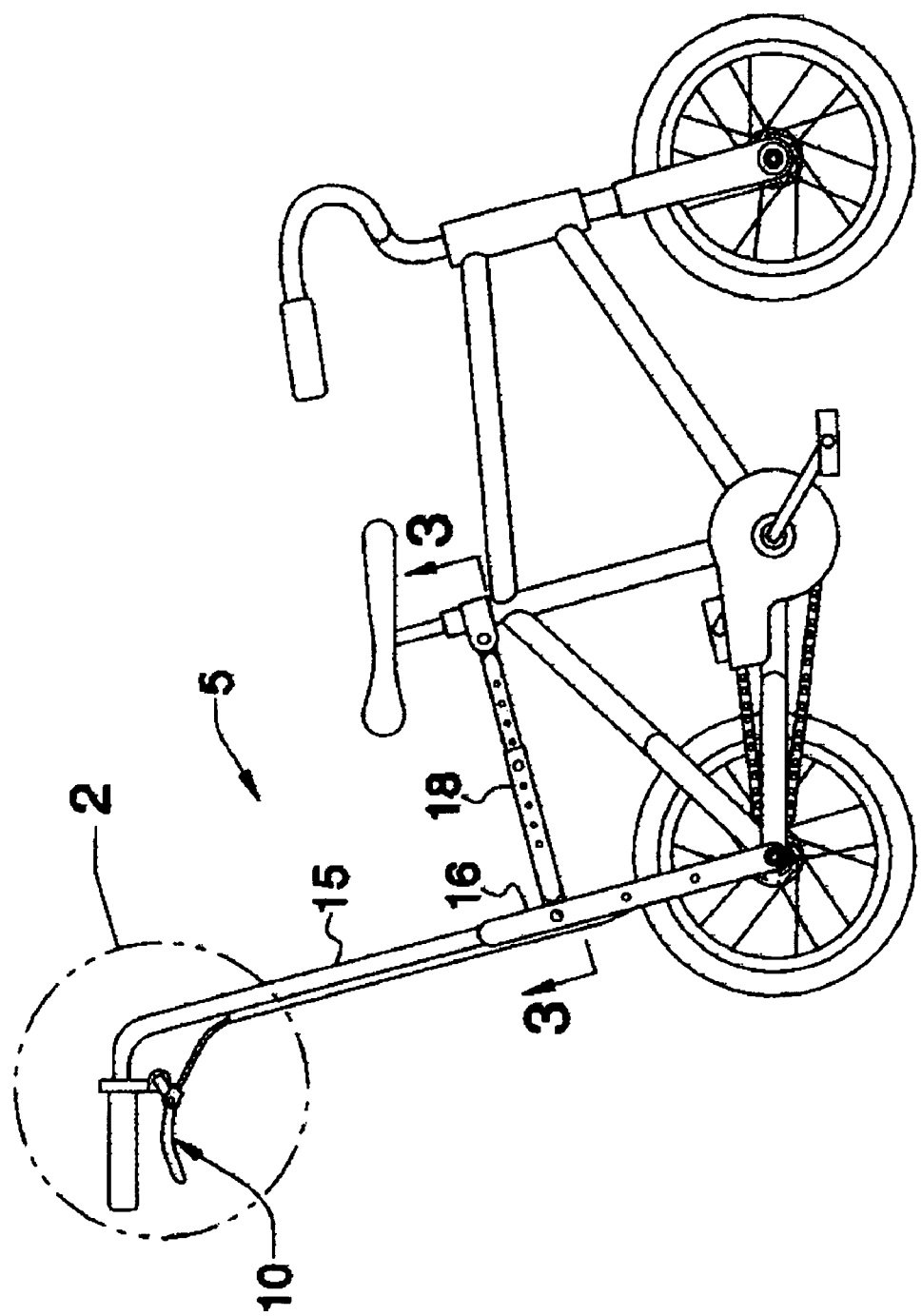
FIG. 1 is a side view of the device installed on a bicycle.
Figure 2:
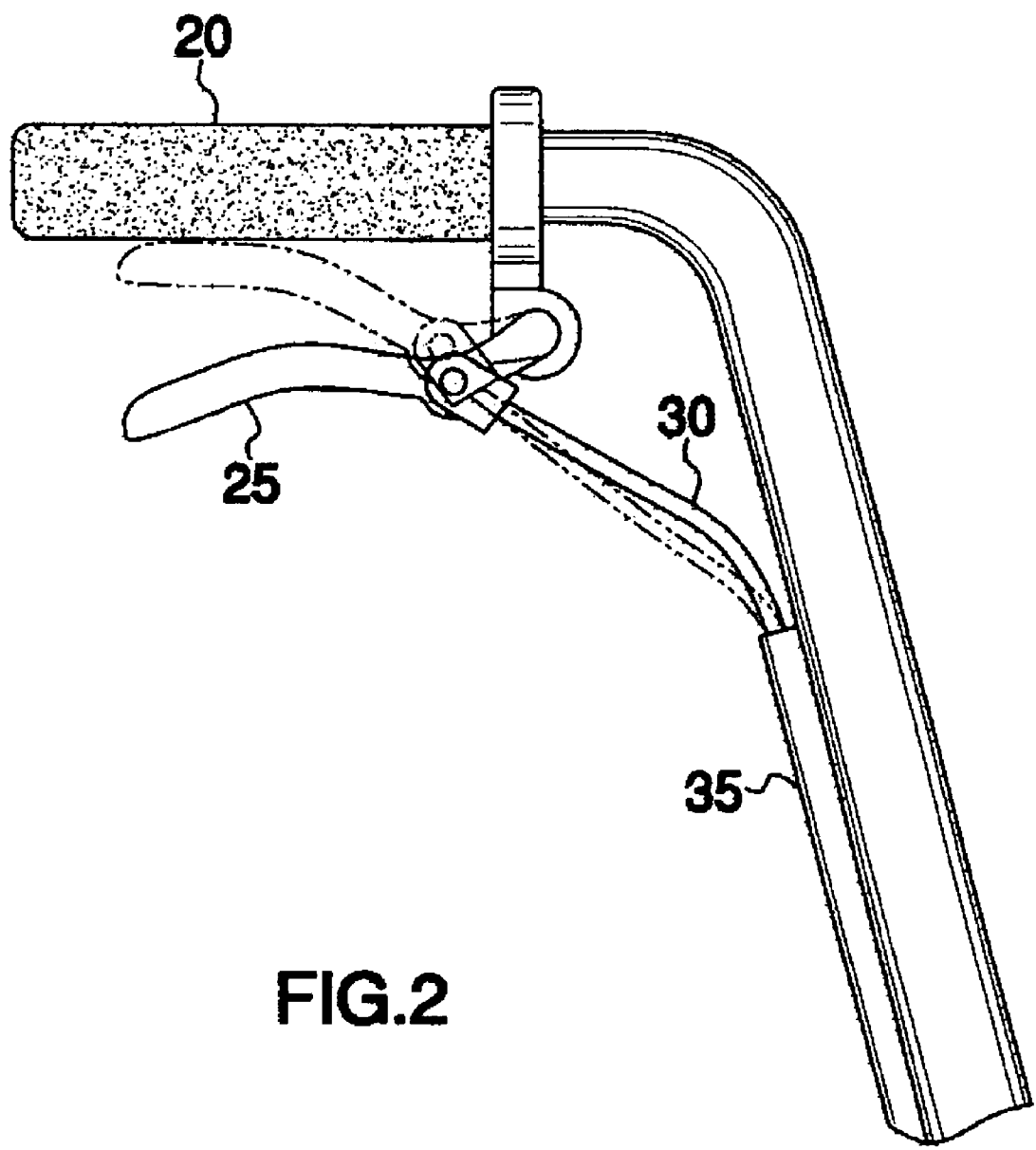
FIG. 2 is a view of the handle mechanism referenced as the circle or "number two" on FIG. 1.
Figure 4:
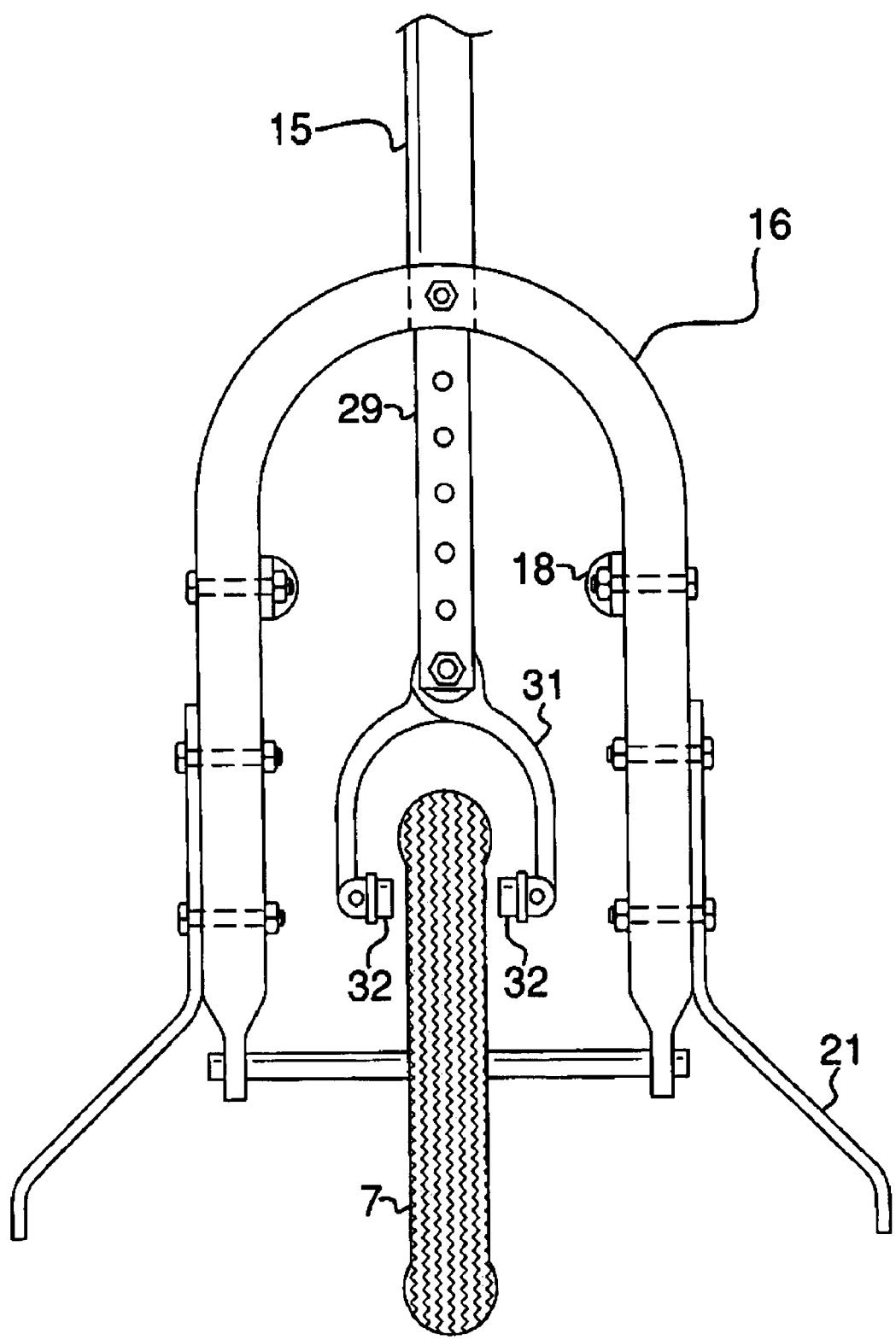
FIG. 4 is a back view of the device.
Figure 5:
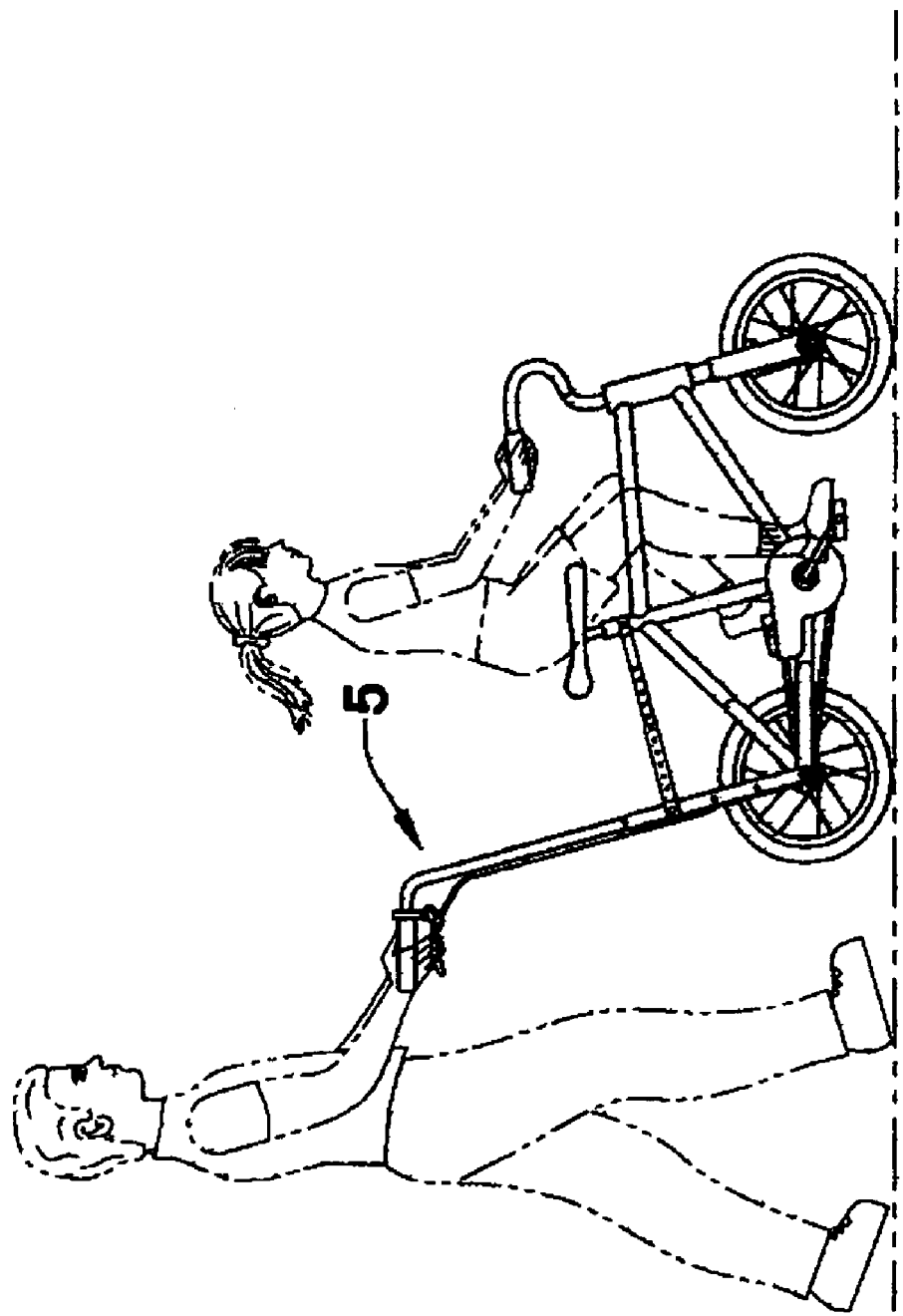
FIG. 5 is a view of the device in use.

The handle bar bracket 16 will be secured to the back wheel of the bike using the existing nuts for the back tire. It will be comprised of a set of forks which are formed in the shape of a "U", which wrap around both sides of the back tire of the bicycle, at one end, and a handle at the second end 20 as depicted in FIGS. 2 and 4.

The handle 20 is rubber covered for the comfort of the parent. Additionally the length of the handle bar 15 is adjustable using a flat planar piece of stock 29 with a series of holes through which a bolt and nut can be placed to change the height of the handle. A handle bar bracket 16 is to secure the handle bar to the bicycle tire. A piece of stock with a series of holes is used to secure the device using the existing nuts for the bicycle tires.

On the opposite end from the handle 20 will be a mechanism to brake the bicycle. The bicycle can be braked by operating a brake level 25, which is attached to a brake cable 30. A set of brake calipers 31 will close around the bicycle tire 7 when the brake handle is squeezed. Appropriate mechanical linkage including a brake support 29 is provided between the brake lever and brake cable to the actual brake surface 32 on the rear wheel 7. The brakes for the bicycle will be comprised of a series of hard rubber pads, which will contact the surface of the wheel rim when the brake lever is squeezed by the user of this device. This type of brake is commonly found on bicycles today and is not being specifically claimed separate from this application.

In order to shield the brake cable from damage the cable 30 a protective sheath 35 will be provided.

Because this device will likely be used with a child, training wheel brackets 21 and training wheels (not depicted) may also be used with this device. Training wheels are found in the prior art and no specific claim to training wheels is being made.

The invention claimed is:

1. A bicycle trainer, which is comprised of:
   a. inner stability bars;
   wherein the inner stability bars have a first end and a second end;
   wherein the first end of the inner stability bars is attached to the bicycle;
   wherein the second end of the inner stability bar is placed inside an outer stability bar;
   b. outer stability bars;
   wherein the outer stability bars have a first end and a second end;
   wherein the outer stability bars are hollow;

wherein the second end of the outer stability bar is attached to a handle bar bracket;
c. handle bar bracket;
said handle bar bracket has a first end and a second end;
wherein the handle bar bracket is comprised of a set of forks;
said fork is in the general shape of an inverted U;
wherein the first end of the handle bar bracket is attached to the outer stability bars;
wherein the second end of the handle bar bracket is attached to the tire of the bicycle;
wherein the handle bar bracket is secured to a handle bar;
d. a handle;
wherein one end of a long cylindrical handle is attached to the back wheel of the bicycle;
wherein the second end of the long cylindrical handle ends at the brake handle;
wherein a means to brake the bicycle is provided on the second end of the handle of the device;
wherein appropriate mechanical linkage is provided between the means to brake on the back wheel of the bicycle;
e. a means to connect to the bolt of the seat.

2. The device as described in claim 1 wherein the means to brake is a series of brake pads, which contact with the surface of the rear wheel rim.

3. The device as described in claim 1 wherein a brake lever is provided.

4. The device as described in claim 1 wherein the training wheels are removable and attach to the side of the forks of the device.

5. The device as described in claim 1 wherein the training wheels are adjustable.

6. The device as described in claim 1 wherein an brake mount is provided.

* * * * *